(12) United States Patent
Kou et al.

(10) Patent No.: US 7,216,236 B2
(45) Date of Patent: May 8, 2007

(54) SECURE SESSION MANAGEMENT AND AUTHENTICATION FOR WEB SITES

(75) Inventors: Wei Dong Kou, Pokfulam (HK); Lev Mirlas, Thornhill (CA); Yan Chun Zhao, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 09/810,288

(22) Filed: Mar. 16, 2001

(65) Prior Publication Data

US 2002/0099936 A1 Jul. 25, 2002

(30) Foreign Application Priority Data

Nov. 30, 2000 (CA) .................................. 2327078

(51) Int. Cl.
*H04L 1/00* (2006.01)
*G06F 7/04* (2006.01)

(52) U.S. Cl. ..................... 713/183; 713/185; 713/159; 726/9; 726/10

(58) Field of Classification Search ................ 713/151, 713/182, 185; 707/9; 726/9, 10; 705/65, 705/66

See application file for complete search history.

(56) References Cited

U.S. PATENT DOCUMENTS

| 5,875,296 | A | * | 2/1999 | Shi et al. | 713/202 |
| 5,963,915 | A | * | 10/1999 | Kirsch | 705/26 |
| 5,966,705 | A | * | 10/1999 | Koneru et al. | 707/9 |
| 6,049,877 | A | * | 4/2000 | White | 713/201 |
| 6,092,196 | A | * | 7/2000 | Reiche | 713/200 |
| 6,598,167 | B2 | * | 7/2003 | Devine et al. | 713/201 |
| 6,691,232 | B1 | * | 2/2004 | Wood et al. | 726/6 |
| 6,701,438 | B1 | * | 3/2004 | Prabandham et al. | 726/11 |

(Continued)

FOREIGN PATENT DOCUMENTS

GB 2349960 11/2000

(Continued)

OTHER PUBLICATIONS

"HTTP State Management Mechanism", D. Kristol, et al, Feb. 1997 pp. 1-44, 49-53.

(Continued)

*Primary Examiner*—Kambiz Zand
*Assistant Examiner*—Linh L D Son
(74) *Attorney, Agent, or Firm*—Duke W. Yee; Jerry W. Herndon; James O. Skarsten

(57) ABSTRACT

The present invention comprises a system and method for secure session management and authentication between web sites and web clients. The method includes both secure and non-secure communication protocols, means for switching between secure and non-secure communication protocols, a session cookie and an authcode cookie. The session cookie is used for session management and the authcode cookie is used for authentication. The session cookie is transmitted using a non-secure communication protocol when the web client accesses a non-secure web page, whereas, the authcode cookie is transmitted using a secure communication protocol when the web client accesses a secure web page. Session management architecture and usage of two distinct cookies along with both secure and non-secure communication protocols prevents unauthorized users from accessing sensitive web client or web site information.

26 Claims, 10 Drawing Sheets

U.S. PATENT DOCUMENTS

| | | | |
|---|---|---|---|
| 6,725,222 B1 * | 4/2004 | Musgrove et al. | 707/10 |
| 6,892,307 B1 * | 5/2005 | Wood et al. | 726/8 |
| 2002/0152378 A1 * | 10/2002 | Wallace et al. | 713/168 |

FOREIGN PATENT DOCUMENTS

| | | |
|---|---|---|
| JP | 11-167595 | 6/1999 |
| JP | 2000-276444 | 10/2000 |
| WO | 0069110 | 11/2000 |
| WO | WO 00/69110 | 11/2000 |

OTHER PUBLICATIONS

Hanai, Hiroyuki, "Let's establish my server with BSD," BSD Magazine 2000, No. 5, pp. 97-106.

* cited by examiner

SECURE SESSION MANAGEMENT AND AUTHENTICATION FOR WEB SITES

FIELD OF THE INVENTION

The present invention pertains to communication between web sites and web clients, and in particular, to session management and authentication means, using secure and non-secure communication protocols, for sessions between web sites and web clients.

BACKGROUND OF THE INVENTION

Many businesses have embraced the Internet as a way to reduce expenses and advertise their services or products to a wide consumer base. These businesses (i.e. web merchants) have setup online shopping web sites to sell soft goods, such as information or software, and/or hard goods. This benefits many consumers (i.e. web clients) who increasingly use the Internet because of the ease with which they can shop online. In fact, online transactions between web merchants and web clients are becoming increasingly more numerous.

Although e-commerce is convenient, it is not problem free since communication between a web client's web browser and an e-commerce web site is based on HTTP (HyperText Transfer Protocol). HTTP is stateless which means that the HTTP protocol does not maintain information about a web client from one visit to the next. As a result, the e-commerce web site must take steps to remember a web client who revisits at a later date. Another problem is that HTTP is not secure which is troublesome since a web client must provide sensitive information, such as a credit card number or an account number, in order to pay for and receive products. An unauthorized user may be watching the HTTP communication to steal this sensitive information. The unauthorized user could then order goods under the web client's identity and request that the goods be sent to a different address or access sensitive web client data such as address and credit card information.

To correct these problems, an e-commerce web site must allow for authentication and session management while holding a conversation with a web client. Further, a secure communication protocol must be used when sensitive information is transmitted between the web client and the e-commerce web site. Session management allows a web site to remember a web client between different login sessions whereas authentication is a security measure which assures a web site that a request came from the same web client who originally logged onto the web site. A secure communication protocol encrypts the data transmitted between the e-commerce web site and a web client. To accomplish authentication and session management, one may utilize HTTP Basic Authentication, Name-Value Pair Authentication or session cookies.

HTTP Basic Authentication always requires a web client to logon before session management. To this end, a login window will pop open when the web client first accesses the web site. This login window is not easily customizable by the web site administrator. Thus, there is no support for guest client access of secure web pages because the web server forces the web client to log on. Consequently, most e-commerce web sites do not use HTTP Basic Authentication.

Name-Value Pair Authentication involves embedding security information in every URL (Uniform Resource Locator) or in the data in every web page on the e-commerce web site. Consequently, the web site developers need to handle authentication for each web page by passing authorization data from one web page to another. This authorization data may be easily lost when the web client jumps from a secure web page to a non-secure web page. Name-value pairs also do not support guest client access of secure web pages because the web server forces the web client to register or log on when accessing a secure web page. The authorization data is also not secure if it is appended to the web page URL since it may be exposed in the web server's log or shown on the web client's web browser. In addition, authorization data included in web page data is not secure since it may be seen by viewing the web browser cache files.

Cookies are the most popular method for session management and authentication between a web site and a web client. Cookies are stored and retrieved on the web client's computer. Permanent cookies are stored on the computer's hard drive meanwhile temporary cookies are stored in volatile memory and erased once the web session is finished. The Netscape Navigator™ web browser stores permanent cookies in a text file (i.e. cookie.txt) with one line in the file being used per cookie, whereas the Microsoft Internet Explorer™ web browser uses a separate text file for each permanent cookie. Cookies are designed to provide useful information about the web client to the web server such as which web pages the web client last accessed. Cookies can also be used to provide some pre-determined level of web client access and customization at a web site. The cookie also contains a description of the set of URLs for which the cookie is valid. Any future HTTP requests made by the web client, which coincide with the set of URLs contained in a cookie, will include a transmittal of the cookie's current value from the web client back to the web server.

The first time that a web client requests information from a web server, that makes use of cookies, the web server delivers the requested information along with a cookie. The cookie is sent, from the web server to the web client, by including a Set-Cookie header as part of an HTTP response. The Set-Cookie header is generated by a CGI script and contains the following attributes: NAME, DATE, PATH, DOMAIN and SECURE. The NAME attribute contains web client related data which is used by the web site. There can be many NAME attributes in a cookie and many Set-Cookie headers can be issued in a single web server response. The DATE attribute specifies a date which indicates when the cookie will expire. The PATH attribute specifies the subset of URLs in a domain for which the cookie is valid. The DOMAIN attribute is the internet domain name of the web site. The SECURE attribute indicates the conditions under which the cookie is transmitted. For instance, if the cookie's SECURE attribute is marked as secure then it will only be transmitted if the communication channel between the web server and the web client is secure.

Cookie based session management must incorporate a secure communication protocol to prevent unauthorized users from stealing sensitive data contained in the cookie. One such protocol is HTTPS (HTTP over SSL). The acronym SSL stands for Secure Socket Layer protocol which is an industry standard for transmitting information securely while using HTTP. HTTPS includes provisions for web server authentication (verifying the web server's identity to the web client), data encryption and web client authentication (verifying the web client's identity to the web server). Each HTTPS enabled web server is installed with both a coder and a decoder which utilize keys and data encryption that are unique. The data encryption, which converts words and numbers into a series of alpha-numeric characters, can only be unlocked by the decoder that comes with the web server licensed to the web merchant. The level of security depends on whether a 40 or 128 bit key is used. The difficulty in cracking the code (or the key) increases with the number of bits contained in the key. Cookie-based session management and authentication schemes have been described in the prior art.

U.S. Pat. No. 5,875,296 discloses a method for providing secure access to a distributed file system via a web site. The method utilizes a single cookie containing a user identifier to access files in the distributed file system. This cookie allows the user to avoid having to re-enter a user ID and password every time information on the distributed file system is accessed. This method is also specific to a distributed file system and does not use a secure communication protocol.

U.S. Pat. No. 6,047,268 discloses a system and method for authenticating web clients who make online purchases. Authentication is provided by a single cookie that contains a static portion identifying the web client's account number and an encrypted dynamic portion which identifies the last transaction made by the web client. This cookie is updated after each new transaction with a new dynamic portion, however, this patent discloses using sensitive information in the cookie and permanent cookie storage on the web client's computer system. In addition, the e-commerce method disclosed in this patent is not flexible enough to allow guest clients to perform online shopping; all web clients must register in order to shop online. U.S. Pat. No. 6,047,268 does disclose the use of HTTPS but does not state if HTTPS is used exclusively or whether the communication protocol switches between HTTPS and HTTP.

U.S. Pat. No. 6,076,069 discloses a system and method for redeeming electronic coupons. When a web client visits a web site, which advertises promotional material from a web merchant, a coupon is stored on the web client's computer system in the form of a cookie. If the web client later visits the web merchant's web site, the web site will recognize the electronic coupon stored in the cookie and offer a discount to the web client. This patent does not teach the use of a secure communication protocol. Furthermore, this patent discloses using sensitive information in the cookies, such as the web client's account number, and the use of persistent cookies (i.e. the cookies are stored permanently on the web client's computer system). Both of these features raise security issues.

The exclusive use of HTTPS entails a performance degradation because of the encoding and decoding which is done each time a web page is accessed. This is inefficient since many web pages, such as product catalog web pages which incidentally obtain the most visits from web clients, do not require protection. In addition, using HTTPS for the web site home page URL can be inconvenient for a web client since the web client is not accustomed to using 'https' in place of 'http' in a web site's URL. Furthermore, switching between HTTP and HTTPS can be troublesome because currently when a web client logs onto a web site using HTTPS, a cookie is issued to authenticate the web client, however, if the web client later browses a non-secure web page at the web site using HTTP, the same cookie is sent to the web client in clear text. At this point an unauthorized user can steal the cookie. Thus, using a single cookie under these circumstances jeopardizes the security of the web site.

Accordingly, there is a need for an improved secure session management and authentication method, using cookies, to protect both the web site and the web client from unauthorized users. The present invention addresses these needs.

SUMMARY OF THE INVENTION

The present invention provides a method for secure session management and authentication between a web site and a web client, the web site having secure and non-secure web pages, the method having the steps of utilizing a non-secure communication protocol and a session cookie when the web client requests access to non-secure web pages; and utilizing a secure communication protocol and an authcode cookie when the web client requests access to secure web pages.

Preferably, the method further includes the steps of requesting the session cookie from the web client when the web client requests access to non-secure web pages and verifying the requested session cookie; and requesting the authcode cookie from the web client when the web client requests access to secure web pages and verifying this requested authcode cookie.

Preferably, the method further includes alternating between the secure and non-secure communication protocol when the web client alternates requests for access to secure and non-secure web pages.

In another aspect, the present invention is a system for secure session management and authentication between a web site and a web client. The system includes a web server, a web client and a communication channel. The web server is coupled to the web client via the communication channel. The web server has a web site which includes secure and non-secure web pages; a non-secure communication protocol and a session cookie for allowing the web client access to non-secure web pages; and a secure communication protocol and an authcode cookie for allowing the web client access to secure web pages.

Preferably, the web site further includes verification means for verifying the session cookie which is requested from the web client; and verification means for verifying the authcode cookie which is requested from the web client.

Preferably, the web server further includes a security alternating means for alternating between the non-secure and secure communication protocol.

It will be appreciated by those skilled in the art that the invention can be embodied in a computer program which can be stored in storage or transmitted as a signal, such as on a modulated carrier signal for use in a computer system, or on a network such as the Internet for use in a computer system.

BRIEF DESCRIPTION OF THE FIGURES

For a better understanding of the present invention, and to show more clearly how it may be carried into effect, reference will now be made by way of example to the accompanying drawings in which.

DETAILED DESCRIPTION OF THE PREFERRED EMBODIMENT

Figure 1:
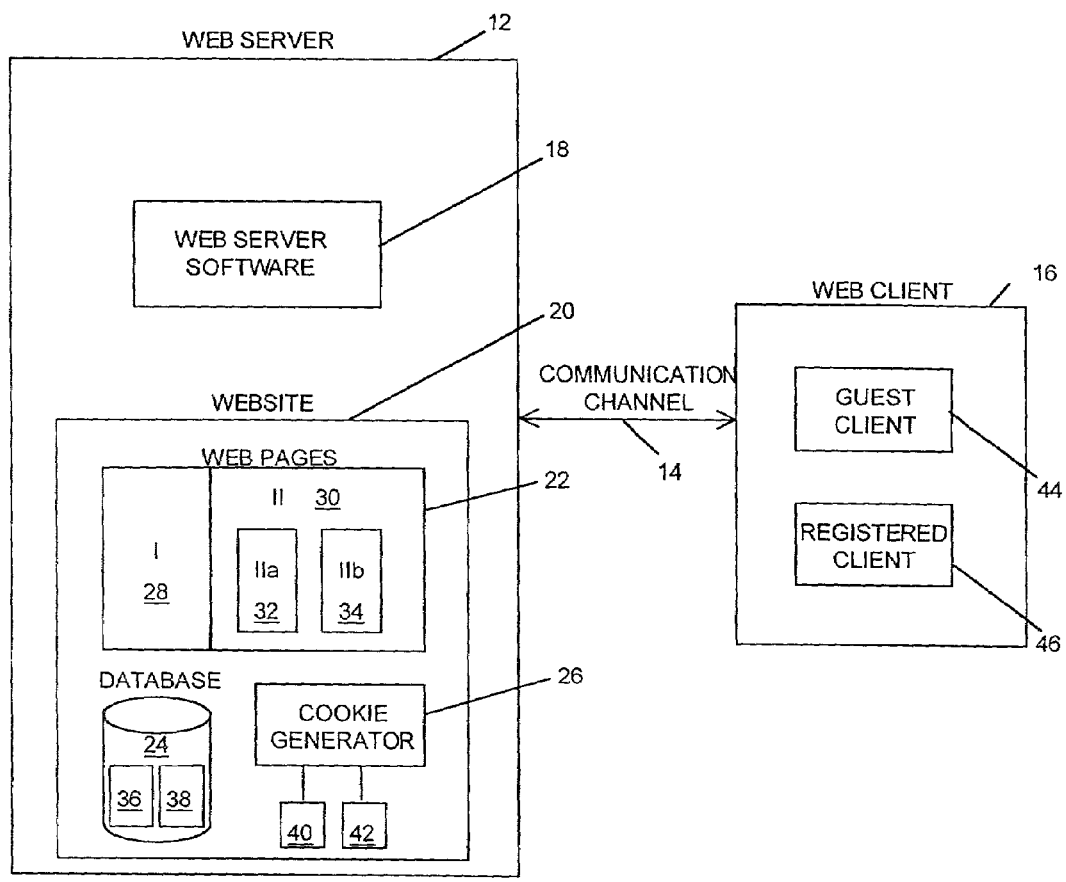
FIG. 1 is a schematic diagram of the components of the present invention.

A secure session management system in accordance with the present invention is shown generally as 10 in FIG. 1. System 10 comprises web server 12, communication channel 14, and web client 16. Web server 12 includes web server software package 18 for creating and maintaining web site 20. Web site 20 includes web pages 22, database 24 and cookie generator 26. Web pages 22 comprises Type I web pages 28 and Type II web pages 30. Type II web pages 30 are further subdivided into Type IIa web pages 32 and Type IIb web pages 34. Database 24 comprises tables which are needed for proper operation of web site 20, however the tables of interest for the present invention are USER_SESSION table 36 and URL_REGISTRY table 38. Cookie generator 26 can produce session cookie 40 and authcode cookie 42. Web client 16 is considered as either guest client 44 or registered client 46 while maintaining a session with web site 20. Hereafter, in the specification and claims, the term 'web client' refers to either guest client 44 or registered client 46. There may be a plurality of web clients 16 accessing web site 20 at the same time, however, only one web client 16 is shown in FIG. 1 for the sake of simplicity. As will be understood by one skilled in the art, web client 16 further comprises a web browser (not shown), to permit web client 16 to access and view the content of web site 20.

Communication channel 14 couples web client 16 to web server 12 and is preferably a TCP/IP (Transfer Communications Protocol/Internet Protocol) based network such as the Internet. TCP/IP is a family of protocols that allow cooperating computers to share resources or data across a network. As one skilled in the art will appreciate, web client 16 may use any of a plurality of means to connect to communication channel 14. For instance, web client 16 may connect to communication channel 14 through an Internet access provider via a phone, cable or wireless modem. Alternatively, the connection may also be through a cable TV network or another access medium. Communication channel 14 may also be an Intranet, a local area network, or a wide area network which is connected directly to the Internet.

Web server 12 uses HTTP (HyperText Transport Protocol), a standard application protocol, to allow web client 16 access to web pages 22, files or other data located on web site 20. Web pages 22 are in HTML (HyperText Markup Language) format which is an industry standard web page description language. HTML provides basic document formatting and allows web server 12 to specify links to other web sites and/or files. Alternatively, other formats may be used for web pages 22 such as ASP (Active Server Page) or JSP (Java Server Page). Web server 12 also contains a web server software package 18 which aids in the creation and maintenance of web site 20. One such web server software package 18 is WCS Version 5.1™ sold by the IBM Corporation.

Web site 20 contains Type I web pages 28 and Type II web pages 30. Type I web pages 28 are identical for all web clients 16 and include static and some dynamically generated web pages. Alternatively, Type II web pages 30 are unique for a given web client 16 and include shopping cart web pages and account information web pages. Shopping cart web pages contain details about impending purchases that web client 16 will make whereas account information web pages contain web client information such as address information. Type II web pages 30 can be further subdivided into Type IIa web pages 32 and Type IIb web pages 34. Type IIa web pages 32 are secure web pages containing sensitive information which require protection from unauthorized users whereas Type IIb web pages 34 are non-secure web pages since they contain information that is not important enough to be protected from unauthorized users. The boundary between Type Ia web pages 32 and Type IIb web pages 34 is not distinct and depends on the security policy defined by the administrator of web site 20. For illustrative purposes, an example of a Type IIa web page 32 is a credit card input web page and an example of a Type IIb web page 34 is a product description web page.

In the preferred embodiment of the present invention, database 24 is a relational database containing a plurality of tables necessary for the management and operation of web site 20. As one skilled in the art will recognize, database 24 need not be resident on web site 20 and may indeed comprise a plurality of files on a plurality of systems. Furthermore, one skilled in the art will appreciate that many types of database structures may be utilized, such as object-oriented databases, network databases, hierarchical databases or even a collection of flat files.

In the present invention, database 24 contains, for the purposes of authentication and session management, USER_SESSION table 36 and URL_REGISTRY table 38. USER_SESSION table 36 is used to manage session information for web client 16 while URL_REGISTRY table 38 is used to determine if a secure or non-secure communication protocol is needed when web client 16 requests access to a particular web page 22 on web site 20.

Figure 2:
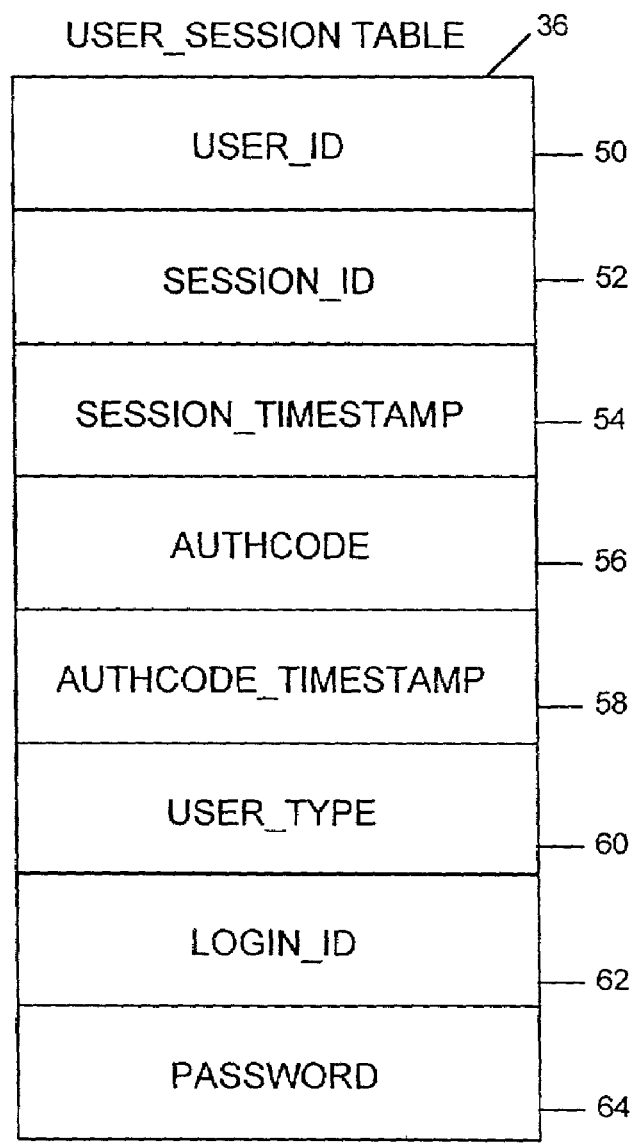
FIG. 2 is a data structure diagram of the fields contained in the USER0_SESSION table.

Each record in USER_SESSION table 36 contains information on a particular web client 16. This information is stored in a plurality of fields contained in USER_SESSION table 36 (see FIG. 2). In the preferred embodiment of the present invention, these fields are: USER_ID 50, SESSION_ID 52, SESSION_TIMESTAMP 54, AUTHCODE 56, AUTHCODE_TIMESTAMP 58, USER_TYPE 60, LOGIN_ID 62 and PASSWORD 64. For a particular web client 16, USER_ID 50 contains a unique key value to identify web client 16 in USER_SESSION table 36. SESSION_ID 52 contains a string to identify the current web session between web client 16 and web site 20, SESSION_TIMESTAMP 54 contains a timestamp indicating when session cookie 40 was created or modified. AUTHCODE 56 contains the authcode (i.e. authorization code) for web client 16. AUTHCODE_TIMESTAMP 58 contains a timestamp indicating when authcode cookie 42 was created or modified. USER_TYPE 60 indicates whether web client 16 is a guest client 44 or a registered client 46. If web client 16 has registered with web site 20 then LOGIN_ID 62 contains a login ID and PASSWORD 64 contains a password. Alternatively, other fields may be added to USER_SESSION table 36 to provide more information about web client 16 or to provide more functionality or to provide a higher level of security for web site 20.

Figure 3:
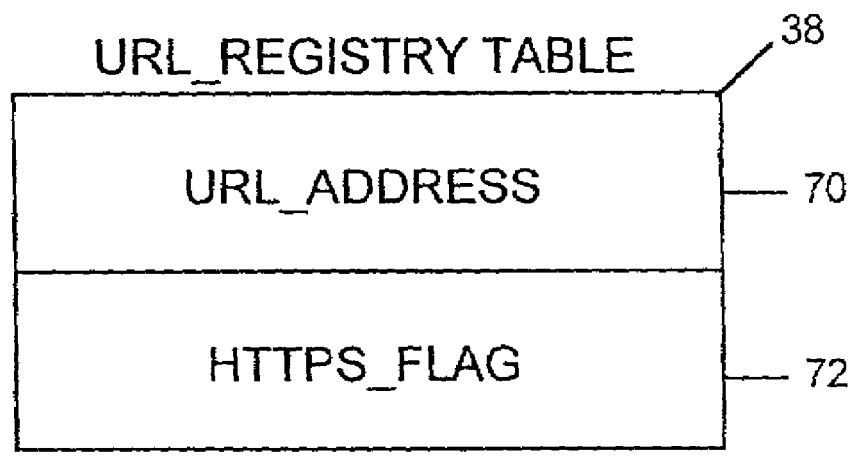
FIG. 3 is a data structure diagram of the fields contained in the URL_REGISTRY table.

Each record in URL_REGISTRY table 38 contains information on a different web page 22 on web site 20. Referring now to FIG. 3, the fields preferably contained in URL_REGISTRY table 38 are URL_ADDRESS 70 and HTTPS_FLAG 72. For a particular web page 22 on web site 20, URL_ADDRESS 70 contains the URL address of web page 22 and HTTPS_FLAG 72 contains a value of 1 if web page 22 requires a secure communication protocol or a value of 0 if web page 22 does not require a secure communication protocol. Alternatively, other fields may be added to URL_REGISTRY table 38 to provide more information about web page 22 or to enhance the security level of web site 20.

Web server 12 allows web client 16 to be either a guest client 44 or a registered client 46 while accessing web site 20, however, web client 16 is a guest client 44 by default each time web site 20 is accessed. Web site 20 allows anonymous guest client status for web clients 16 who only want to browse web site 20 or make one purchase and then never access web site 20 again. Guest client 44 does not need a login ID or password for web site 20, however, guest client 44 can browse web site 20, access both secure and non-secure web pages, and order products. Guest client 44 must continually re-enter client specific information such as a shipping address and a credit card number on each purchase at web site 20. Futhermore, guest client 44 can not revisit web site 20 and inquire about previous purchases (i.e. the order history).

A registered client 46 is a web client 16 who has registered with web site 20 and has logged in as a registered client. Registered clients can set up a customized account for a customized online shopping experience. Guest client 44 can register by completing a registration form (which can be customized by the administrator of web site 20). The registration form could request the web client's name, residential address, e-mail address, preferred method of payment, login ID and password as well as other information. This information is stored in a table, containing web client information, in database 24 for future retrieval or modification. Credit card information specific to registered client 46 is also stored in database 24. By storing this information, registered client 46 is not required to reenter a credit card number with each purchase.

Web server 12 has cookie generator 26 which generates session cookie 40 and authcode cookie 42 which are transferred between web server 12 and web client 16. The communication protocol can be either HTTP or HTTPS when session cookie 40 is transmitted, however, when authcode cookie 42 is transmitted the communication protocol must be HTTPS. In the preferred embodiment, web site 20 utilizes HTTPS with either a 40 or 128 bit key as the secure communication protocol. The administrator of web site 20 decides which key size is used. Preferably a 128 bit key should be used. It is not the intent of the inventor to restrict the key size to 40 or 128 bits but rather it is instead a suggestion based upon the common technology in use at the time of the invention. HTTPS is implemented on many web browsers such as Netscape Navigator™, Secure Mosaic™ and Microsoft Internet Explorer™. HTTPS is also implemented on web servers made by Netscape, Microsoft and IBM Quarterdeck.

Session cookie 40 is responsible for session management, while authcode cookie 42 is responsible for authentication. In the preferred embodiment, session cookie 40 and authcode cookie 42 are temporary cookies which are erased when web client 16 closes their web browser. Alternatively, one may define session cookie 40 to be permanently stored on the computer system of web client 16, however, authcode cookie 42 should always be temporary for security reasons.

As described earlier, a cookie comprises the following attributes: NAME, DATE, PATH, DOMAIN and SECURE. The data used in the NAME attribute of session cookie 40 preferably comprises data contained in USER_ID 50, SESSION_ID 52 and SESSION_TIMESTAMP 54. Other optional information (not shown) may be included in the NAME attribute of session cookie 40 if so desired. The data from USER_ID 50 is a unique key used to access the data for web client 16 stored in USER_SESSION table 36. SESSION_ID 52 contains a string which is randomly generated by a cryptographic random number generator. The cryptographic random number generator has the essential property that no one can predict the value of the number that will be generated. In the preferred embodiment of the present invention, the cryptographic random number generator is the rand( ) function in the C standard library which is available in all commercial C compilers. Although the rand( ) function only generates numbers, random strings may also be generated by mapping the randomly generated number to a letter of the alphabet by dividing the randomly generated number by 26 and mapping the remainder from this division operation to a letter whereby a remainder of 0 would map to the letter A, a remainder of 1 would map to the letter B, a remainder of 2 would map to the letter C and so on. For example purposes, if a string with 10 characters is desired then this process of number generation, division by 26 and mapping of the remainder to a letter is repeated 10 times. The data from SESSION_TIMESTAMP 54 is a timestamp indicating the time at which session cookie 40 was created or modified which occurs when web client 16 either logs on as a guest client 44, registers to become a registered client 46 or logs on as a registered client 46. The data from SESSION_TIMESTAMP 54 is included in session cookie 40 to provide time sensitive information which increases the security of web site 20 by allowing session cookie 40 to be more unique and thus harder to duplicate.

The data contained in the NAME attribute in session cookie 40 is generated by appending the data from SESSION_TIMESTAMP 54 to SESSION_ID 52, applying a one-way MD5 hash function and appending the result of the MD5 hash function to the data from USER_ID 50. The MD5 one-way hash function takes a variable length input string and converts it to a 128 bit binary sequence. The MD5 one-way hash function is designed such that it is hard to reverse the hash process to obtain the input string that was hashed. In the preferred embodiment, the MD5 one-way hash function from the BSAFE™ toolkit developed by RSA Laboratories is used. The PATH attribute of session cookie 40 is specified as '/' which means that the web browser of web client 16 must send session cookie 40 back to web server 12 when web client 16 requests access to any URL path on web site 20. The EXPIRES attribute is not specified since session cookie 40 is temporary and the DOMAIN attribute is not specified since the web browser of web client 16 will use the domain name of web server 12. The SECURE attribute is left unspecified since a secure communication protocol is not required when session cookie 40 is transmitted between the web browser of web client 16 and web site 12. If web client 16 is a registered client 46, then the next time web client 16 accesses web site 20, the data contained in SESSION_ID 52 is used to generate session cookie 40, however, if web client 16 is only a guest client 44 then new data from stored in SESSION_ID 52 is used when session cookie 40 is generated.

The data used in the NAME attribute of authcode cookie 42 preferably comprises the data stored in AUTHCODE 56 and AUTHCODE_TIMESTAMP 58. Other optional information (not shown) may be included in the NAME attribute of authcode cookie 42 if so desired. The data in AUTHCODE 56 is preferably a randomly generated string or integer generated by the same cryptographic random number generator used to generate the data contained in SESSION_ID 52 for session cookie 40. Alternatively, a different cryptographic random number generator may be used. The data contained in AUTHCODE_TIMESTAMP 58 is a timestamp indicating the time at which authcode cookie 42 was created or modified which occurs when web client 16 either accesses secure web page 32 as a guest client for the first time, became a registered client 46 or logs onto web site 20 as a registered client 46. The data contained in AUTH-CODE_TIMESTAMP 58 is included in authcode cookie 42 for the same security purposes described above for session cookie 40.

The data in the NAME attribute of authcode 42 is generated by appending the data stored in AUTHCODE_TIMESTAMP 58 to AUTHCODE 56 and applying the one-way MD5 hash function. The EXPIRES attribute is not specified since authcode cookie 42 is temporary and the DOMAIN attribute is not specified since the web browser of web client 16 will use the domain name of web server 12. The SECURE attribute is specified since a secure communication protocol is required when authcode cookie 42 is transmitted between the web browser of web client 16 and web server 12. The PATH attribute of authcode cookie 42 is specified as '/' which means that the web browser of web client 16 must send authcode cookie 42 to web server 12 whenever web client 16 requests access to any URL path on web site 20. However, since the SECURE attribute is set, authcode cookie 42 is only sent when the communication protocol used by the web browser of web client 16 is secure.

Web client 16 can either be a guest client 44 or a registered client 46 when accessing web site 20. By default, web client 16 is considered a guest client 44 every time web client 16 accesses web site 20. Web client 16 can then remain a guest client 44 or register to become a registered client 46, or log on as a registered client 46 if web client 16 had previously registered with web site 20. In all instances, web client 16 uses a web browser to view web pages 22 on web site 20. The web browser could be Netscape Navigator™, Microsoft Internet Explorer™ or any other suitable web browser. Web client 16 connects to web site 20 by requesting its URL which is a special syntax defining a network address. When web client 16 requests a URL, the web browser of web client 16 will compare the requested URL with all cookies stored on the computer system of web client 16 and a line containing the name/value pairs of all matching cookies will be included in the request for web site 20. If web client 16 has disabled cookie use in their web browser, then web client 16 will not be able to access web site 20. In this case, web server 12 will inform web client 16 that cookie usage must be enabled on their web browser.

The method of the present invention relies on several component processes and basic definitions. Firstly, web site 20 must enforce the use of HTTPS when web client 16 requests access to secure web pages 32. Secondly, the login and registration web pages on web site 20 are defined to be secure web pages 32. The component processes will now be shown in pseudocode format and discussed.

The pseudocode for the process by which web site 20 determines whether a secure or non-secure communication protocol is required between web client 16 and web site 20 is shown below as Process A.

---

Process A: Determination of Need for Secure or Non-Secure Communication Protocol.

---

```
web client 16 requests web page 22
determine URL of requested web page 22
obtain corresponding value in HTTPS_FLAG 72
if value in HTTPS_FLAG 72 = 0
    process request of web client 16
elseif value in HTTPS_FLAG 72 = 1
    instruct web client 16 to go to secure web site URL
    web client 16 uses HTTPS
    process request of web client 16
```

---

Process A begins when web client 16 requests access to web page 22 on web site 20. Web server 12 then determines the URL of web page 22 and uses it as a key for URL_REGISTRY table 38 to obtain the value contained in HTTPS_FLAG 72 corresponding to web page 22. If the value contained in HTTPS_FLAG 72 is zero then HTTPS is not needed and the request of web client 16 is processed regardless of whether web client 16 is using HTTP or HTTPS. Otherwise, if HTTPS_FLAG 72 contains a value of one, then web server 12 instructs the web browser of web client 16 to go to the secure web site URL corresponding to web page 22. This is done by providing the secure web site URL in the HTTP header that web server 12 sends to the web browser of web client 16. The web browser of web client 16 knows to use HTTPS because 'https' is contained in the URL that was sent. The web browser of web client 16 then uses HTTPS to request access to web page 22 after which the request is processed. In the preferred embodiment, the communication protocol must be switched from HTTP to HTTPS if access to secure web page 32 is requested while web client 16 is using HTTP, however, if web client 16 is using HTTPS while requesting access to non-secure web page 34 then the communication protocol is left as is. Alternatively, the administrator of web site 20 can change this feature, by using web server software 18, such that if HTTPS is being used and web client 16 requests access to non-secure web page 34 then the communication protocol is switched to HTTP.

Another process used to create a guest client account or a session cookie when web client 16 either accesses web site 20 for the first time or revisits web site 20, does not have session cookie 40 and is not a registered client 46. The pseudocode for this process is shown as Process B.

---

Process B: Create Guest Account and Session Cookie.

---

```
create user entry in USER_SESSION table 36
mark USER_TYPE 60 to show guest user status
generate data for SESSION_ID 52
generate data for SESSION_TIMESTAMP 54
apply one-way hash function
generate session cookie 40
send session cookie 40 to web client 16
```

---

Process B begins when web server 12 creates a guest client entry in USER_SESSION table 36 by adding a new record. The creation of a new record in USER_SESSION table 36 includes generating a new key value and storing it in USER_ID 50 in the newly created record in USER_SESSION table 36. Next 'guest' or another suitable identifier is stored in USER_TYPE 60 for the newly created guest client entry. The data, preferably a string, for SESSION_ID 52 is then randomly generated by the cryptographic random number generator previously described and stored in SESSION_ID 52. Next, the data for SESSION_TIMESTAMP 54 is calculated and stored in SESSION_TIMESTAMP 54. The one-way MD5 hash function is then preferably applied to the concatenation of the data contained in SESSION_ID 52 and SESSION_TIMESTAMP 54 (the data contained in SESSION_TIMESTAMP 54 is appended to the data contained in SESSION_ID 52). Alternatively, a different hash function may be used. Numerous hash functions are well known in the art, a fundamental reference being "The Art of Computer Programming, Volume 3: Searching and Sorting", by Donald E. Knuth in which Professor Knuth provides a seminal discussion on the mathematics of creating a hash function. The result of the MD5 hash function is concatenated with the data contained in USER_ID 50 and stored in the NAME attribute of session cookie 40. Web server 12 then assigns the other attributes of session cookie 40 and sends session cookie 40 to the web browser of web client 16.

Another component process is used for the creation of authcode cookie 42. This usually occurs when guest client 44 requests access to secure web page 32 and is using the HTTPS communication protocol but does not have authcode cookie 42. The pseudocode for this process is shown as Process C.

---
Process C: Creating an Authcode Cookie.
---
obtain data in session cookie 40 corresponding to
 USER_ID 50
if AUTHCODE 56 != ""
    deny request
else
    generate data for AUTHCODE 56
    generate data Eor AUTHCODE_TIMESTAMP 58
    apply one-way hash function
    generate and send authcode cookie 42 to web client 16
---

Process C begins by extracting data from the NAME attribute of session cookie 40 corresponding to the data stored in USER_ID 50. This data is then used as a key into USER_SESSION table 36 to determine whether an authorization code is contained in AUTHCODE 56 for guest client 44. If an authorization code is contained in AUTHCODE 56 then web client 16 may be an unauthorized user so web server 12 denies the request, generates an error web page and sends this error web page to the web browser of guest client 44. Alternatively, if AUTHCODE 56 is empty, then data for AUTHCODE 56, preferably a string or an integer, is randomly generated by the cryptographic random number generator previously described. This data is then stored in AUTHCODE 56. Next, the current timestramp is stored in AUTHCODE_TIMESTAMP 58. The MD5 one-way hash function is then preferably applied to the concatenation of the data contained in AUTHCODE 56 and AUTHCODE_TIMESTAMP 58 (the data contained in AUTHCODE_TIMESTAMP 58 is appended to the data contained in AUTHCODE 56). Alternatively, a different hash function may be used as described above. The result of the MD5 hash function is then stored in the NAME attribute of authcode cookie 42. The rest of the attributes of authcode cookie 42 are assigned and web server 12 then sends authcode cookie 42 to the web browser of guest client 44.

Another component process handles the case when guest client 44 decides to become a registered client 46 while browsing web site 20. The pseudocode is shown below as Process D.

---
Process D: Guest Client chooses to become Registered Client.
---
direct guest client 44 to registration web page
obtain data in session cookie 40 corresponding to
 USER_ID 50
mark USER_TYPE 60 to show registered user status
modify data in SESSION_TIMESTAMP 54 and update session
 cookie 40
create or update authcode cookie 42
send session cookie 40 and authcode cookie 42 to
 registered client 46
obtain and store information about registered client 46
---

Process D begins by directing guest client 44 to a registration web page where they provide confidential information and select a login ID and a password. Data from the NAME attribute of session cookie 40 corresponding to the data stored in USER_ID 50 is then extracted and used to access the correct guest client entry in USER_SESSION table 36. The value in USER_TYPE 60 is then changed to 'registered' or another suitable identifier for guest client 44. Guest client 44 is now considered to be registered client 46. The timestamp in SESSION_TIMESTAMP 84 is updated. Session cookie 40 is then modified using the new data contained in SESSION_TIMESTAMP 54. Next, if authcode cookie 42 does not exist it is created, otherwise it is modified. Authcode cookie 42 is then modified by updating the timestamp stored in AUTHCODE_TIMESTAMP 58 and using this updated timestamp to modify the NAME attribute of authcode cookie 42. Session cookie 40 and authcode cookie 42 are then sent to the web browser of registered client 46. The login ID, password and other important information entered by registered client 46 is then obtained from the data entered at the registration web page. The login ID is stored in LOGIN_ID 62 in USER_SESSION table 36 and the password is stored in PASSWORD 64 in USER_SESSION table 36. Other information obtained is stored elsewhere in database 24.

Another component process handles the situation in which a guest client 44, who is already registered with web site 20, logs on to be recognized as a registered client 46. The pseudocode is shown as Process E.

---
Process E: Guest Client logs on as a Registered Client.
---
guest client 44 enters login ID and password
if login ID and password are not valid then
    direct guest client 44 back to login web page
else
    find guest client entry in USER_SESSION table 36
    update data contained in SESSION_TIMESTAMP 54
    update session cookie 40
    update data contained in AUTHCODE_TIMESTAMP 58
    update authcode cookie 42
    send session cookie 40 and authcode cookie 42 to
     registered client 46
    delete guest client entry in USER_SESSION table 36
---

Process E begins when guest client 44 is directed to a login web page on web site 20 where they enter their login ID and password. If the login ID and password are not valid then web server 12 informs guest client 44 that either an invalid login ID and/or password was entered and that guest client 44 must re-enter this information. As one skilled in the art will recognize, the login process may be terminated after a certain number of invalid attempts to login. When the correct login ID and password are entered, the login ID and password are used to find the correct guest client entry in USER_SESSION table 36. Next, the timestamp in SESSION_TIMESTAMP 54 is updated and session cookie 40 is then updated based on this new timestamp value. Next, the timestamp in AUTHCODE_TIMESTAMP 58 is updated and authcode cookie 42 is then updated based on this new timestamp value. Next, session cookie 40 and authcode cookie 42 are sent to the web browser of guest client 44. The last step is an optional step to delete the guest client account that was set up for guest client 44 when web site 20 was first accessed. Alternatively, the administrator of web site 20 can use other utilities, provided by web server software package 18, to remove guest client accounts that become stale (i.e. that are not used for a predetermined amount of time such as two days).

Another component process is used for verifying session cookie 40 when web client 16 requests access to a non-secure web page 34 on web site 20. This process ensures that session cookie 40 has not been tampered with. The pseudocode is shown below as Process F.

---
Process F: Session Cookie Verification.
---
obtain data in session cookie 40 corresponding to
USER_ID 50
get stored data in SESSION_ID 52 and
SESSION_TIMESTAMP 54
regenerate session cookie 40
if regenerated session cookie = web client's session
cookie 40
    process request of web client 16
else
    deny request
---

Process F begins by extracting data from the NAME attribute of session cookie 40 corresponding to the data stored in USER_ID 50. This data is then used to find the entry for web client 16 in USER_SESSION table 36 to obtain the stored values in SESSION_ID 52 and SESSION_TIMESTAMP 54. These stored values are used to regenerate session cookie 40. Regenerated session cookie 40 is then compared to session cookie 40 provided by web client 16. If the comparison results in equality then the request of web client 16 is processed. However, if the comparison does not result in equality then web client 16 may be an unauthorized user so web server 12 denies the request of web client 16 to access non-secure web page 34 and sends an error web page to the web browser of web client 16.

Another component process is used for verifying authcode cookie 42 when web client 16 requests access to secure web page 32 on web site 20. This process ensures that authcode cookie 42 has not been tampered with. In this process, web client 16 is using the HTTPS communication protocol and has both session cookie 40 and authcode cookie 42. The pseudocode is shown below as Process G.

---
Process G: Authcode Cookie Verification.
---
obtain data in session cookie 40 corresponding to
USER_ID 50
get stored data in AUTHCODE 56 and AUTHCODE_TIMESTAMP 58
regenerate authcode cookie 42
if regenerated authcode cookie = web client's authcode
cookie 42
    process request of web client 16
else
    deny request
---

Process G begins by extracting data from the NAME attribute of session of cookie 40 corresponding to the data stored in USER_ID 50. This data is then used to find the entry for web client 16 in USER_SESSION table 36 to obtain the stored values contained in AUTHCODE 56 and AUTHCODE_TIMESTAMP 58. These stored values are used to regenerate authcode cookie 42. Regenerated authcode cookie 42 is then compared to authcode cookie 42 provided by web client 16. If the comparison results in equality then web server 12 processes the request of web client 16. If the comparison does not result in equality then web client 16 may be an unauthorized user so web server 12 denies the request of web client 16 to access secure web page 32 and sends an error web page to the web browser of web client 16.

Another component process is used to handle the case when registered client 46 logs out of web site 20. The pseudocode is shown below as Process H.

---
Process H: Registered Client Logs out.
---
registered client 46 chooses to log out
web server 12 updates session cookie 40 and authcode
cookie 42
web server 12 sends session cookie 40 and authcode
cookie 42 to registered client 46
---

Process H begins when registered client 46 chooses to log out of web site 20. Next, web server 12 updates session cookie 40 and authcode cookie 42 such that all attributes contain NULL values. Web server 12 then sends updated session cookie 40 and updated authcode cookie 42 to the web browser of registered client 46. Alternatively, registered client 46 may not log out and simply visits another web site in which case both session cookie 40 and authcode cookie 42 will remain in the memory of the web browser used by registered client 46. If registered client 46 revisits web site 20 then the web browser of registered client 46 will send session cookie 40 back to web server 12. Alternatively, registered client 46 may simply quit their web browser application without logging out of web site 20 in which case session cookie 40 and authcode cookie 42 will be destroyed since they are preferably temporary cookies.

Another component process handles the situation in which registered client 46 requests access to secure web page 32 but does not possess authcode cookie 42. The pseudocode is shown below as Process I.

---
Process I: Registered Client accesses Secure Web
page without authcode cookie.
---
previously registered web client 16 requests access to
secure web page 32 and does not have authcode cookie 42
if registered web client has authcode cookie
    process request
else
    force previously registered web client 16 to log on
    if login ID and password are valid
        create authcode cookie 42 and send to registered
        client 46
        process request for secure web page 32
    else
        deny request
---

Process I begins when web client 16, who is already registered with web site 20 (i.e. previously registered web client 16), attempts to access secure web page 32 but has not yet logged onto web site 20 to indicate that they are a registered client 46. Next, previously registered web client 16 is checked to see if they have authcode cookie 42. Since previously registered web client 16 does not have authcode cookie 42, previously registered web client 16 is forced to log on to web site 20 by entering their login ID and password at the login web page. Next, the login ID and password are verified. If verification fails, then web server 12 denies the request of previously registered web client 16 to access secure web page 32 and sends an error web page to the web browser of previously registered web client 16. However, if the login ID and password are valid, then authcode cookie 42 is created and sent to the web browser of previously registered web client 16. Previously registered web client 16 is then recognized as a registered client 46. The request of registered client 46 to access secure web page 32 is then granted.

In practice, there are three general usage scenarios for web site 20 in accordance with the session management and authorization scheme outlined in the present invention. In general, either web client 16 accesses web site 20 and is a guest client 44 throughout the entire session with web site 20 (see FIGS. 4*a* and 4*b*), or web client 16 accesses web site 20 and becomes a registered client 46 (see FIGS. 5*a*, 5*b* and 5*c*), or web client 16 accesses web site 20, is already registered, and logs on as a registered client 46 (see FIGS. 6*a* and 6*b*). Bear in mind that although FIGS. 4*a*, 4*b*, 5*a*, 5*b*, 5*c*, 6*a* and 6*b* show web client 16 first accessing a plurality of non-secure web pages 34, followed by accessing a plurality of secure web pages 32, the opposite may also happen, i.e. web client 16 may first access a plurality of secure web pages 32 followed by accessing a plurality of non-secure web pages 34. Alternatively, web client 16 may alternate requests to non-secure web pages 34 and secure web pages 32. In practice, there can be many usage cases but for the sake of simplicity only a few are shown in FIGS. 6 to 8.

Figure 4A:
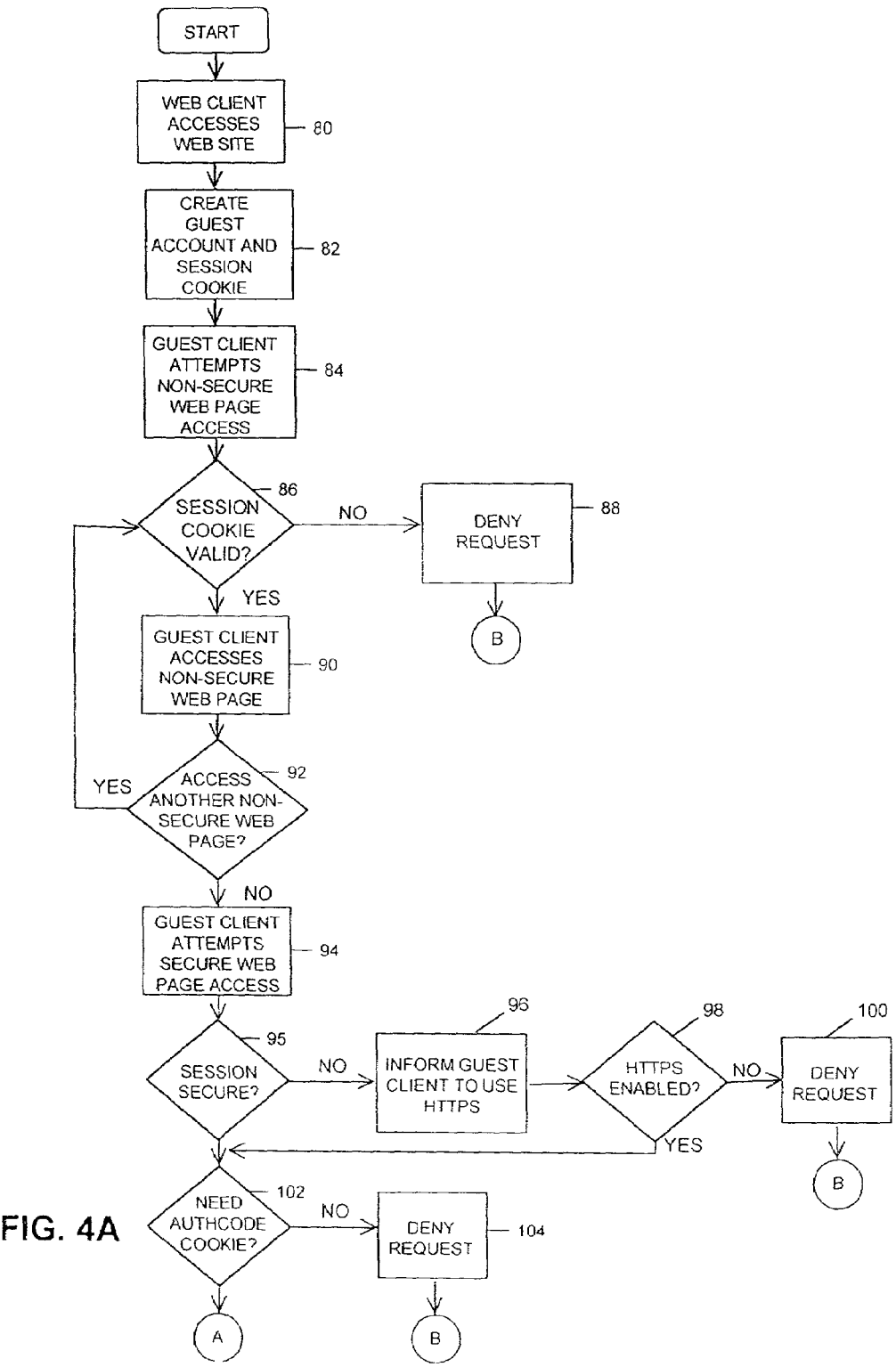
FIG. 4a and FIG. 4b together comprise a flowchart of a first usage scenario of the present invention.
Figure 4B:
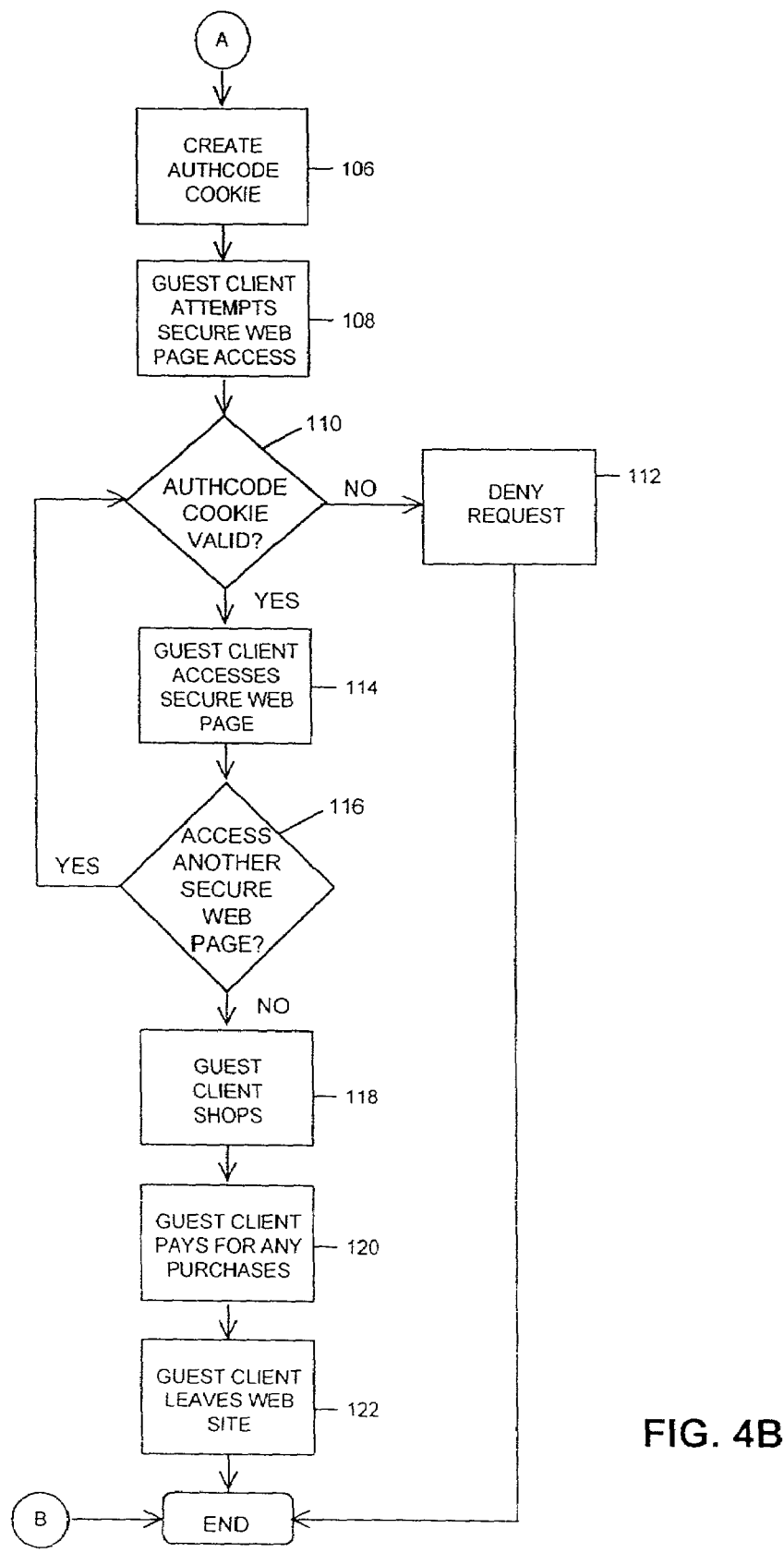

Referring now to FIGS. 4*a* and 4*b*, the scenario begins at step 80 where web client 16 accesses web site 20. By default, web client 16 is defined to be a guest client 44. Next, in step 82, a guest client account in USER_SESSION table 36 and session cookie 40 are created for guest client 44. Guest client 44 then goes on to request access to non-secure web page 34 in step 84. Session cookie 40 is then verified in step 86. If session cookie 40 is not valid then control passes to step 88 where web server 12 denies the request of guest client 44 for access to non-secure web page 34 and sends an error web page to the web browser of guest client 44. Alternatively, if session cookie 40 is valid then control moves to step 90 where guest client 44 accesses non-secure web page 34. Guest client 44 can then access a number of non-secure web pages 34 in which verification of session cookie 40 occurs with each access request. Eventually, guest client 44 requests access to secure web page 32 in step 94. Web server 12 then checks to see if guest client 44 is using HTTPS in step 95. If HTTPS is not being used, then web server 12 informs the web browser of guest client 44 to use HTTPS in step 96. If an HTTPS connection is not verified in step 98 then web server 12 denies the request of guest client 44 to view secure web page 32 and sends an error web page to the web browser of guest client 44 in step 100. Otherwise, if guest client 44 is using HTTPS then in step 102 web server 12 checks whether guest client 44 needs authcode cookie 42 by checking if there is an authorization code in AUTHCODE 56 in USER_SESSION table 36. If guest client 44 already has an authorization code then control passes to step 104 where web server 12 denies the request of guest client 44 for access to secure web page 32, since guest client 44 may be an unauthorized user at this point, and sends an error web page to the web browser of guest client 44. However, if guest client 44 does not an authorization code then control passes to step 106 where authcode cookie 42 is created and sent to guest client 44. Guest client 44 can then access secure web page 32. Next, in step 108, guest client 44 requests access to another secure web page 32 on web site 20 at which point authcode cookie 42 of guest client 44 is checked to see if it is valid in step 110. If authcode cookie 42 is not valid then the process flows to step 112 where web server 12 denies the request for access to secure web page 32 and sends an error web page to the web browser of guest client 44. Alternatively, if authcode cookie 42 is valid then guest client 44 can access secure web page 32 in step 114. Guest client 44 can then access a number of other secure web pages 32 in which verification of authcode cookie 42 occurs with each access request. Next, in step 118, guest client 44 does some shopping and in step 120 pays for any goods that were purchased and provides shipping information. Guest client 44 then leaves web site 20 by simply closing their web browser or accessing a different web site in step 122. Once the web browser of guest client 44 is closed, session cookie 40 and authcode cookie 42 are erased since they are temporary cookies.

Figure 5A:
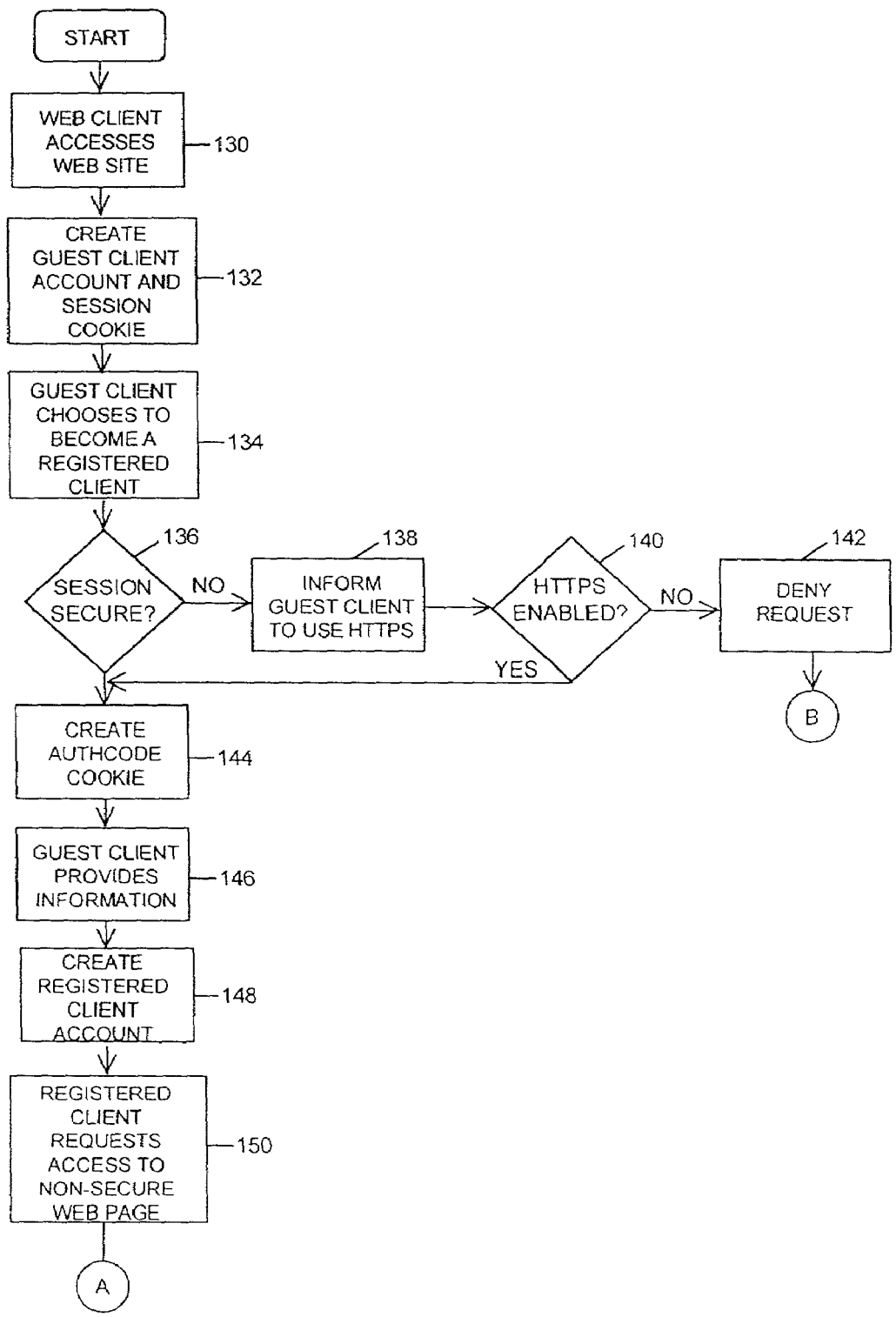
FIG. 5a, FIG. 5b and FIG. 5c together comprise a flowchart of a second usage scenario of the present invention.
Figure 5B:
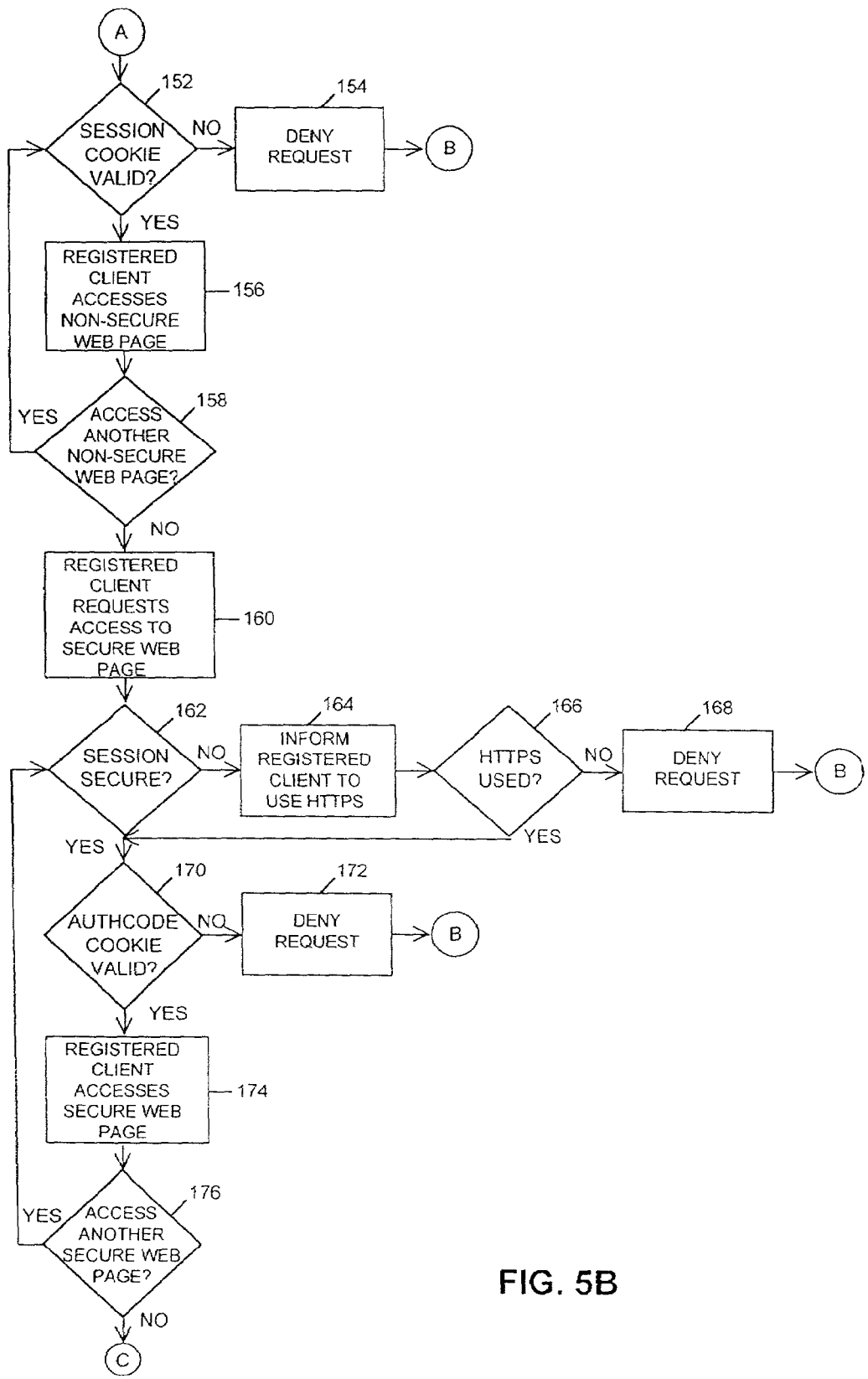
Figure 5C:
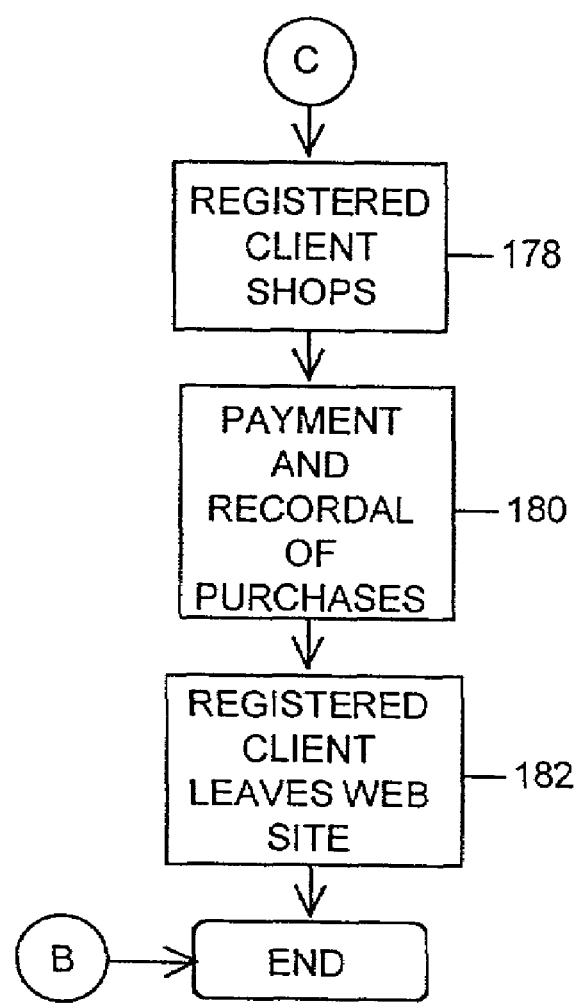

Referring now to FIGS. 5*a*, 5*b* and 5*c*, the scenario begins at step 130 where web client 16 accesses web site 20. By default, web client 16 is defined to be a guest client 44. Next, in step 132, a guest client account is created in USER_SESSION table 36 and session cookie 40 is also created. Session cookie 40 is then sent to the web browser of guest client 44. Guest client 44 then decides to become a registered client 46 in step 134. Web server 12 then checks to see if HTTPS is being used by guest client 44 in step 136. If not, then the process flows to step 138 where web server 12 informs the web browser of guest client 44 to use HTTPS. The use of an HTTPS connection is checked in step 140. If HTTPS is not used, then the process flows to step 142 where web server 12 denies the request of guest client 44 to become a registered user and sends an error web page to the web browser of guest client 44. Alternatively, if HTTPS is being used by guest client 44, then control passes to step 144 where authcode cookie 42 is created for guest client 44. Next, in step 146, guest client 44 is directed to a registration web page on web site 20 where guest client 44 provides client information. In step 148, a registered client account is created and guest client 44 becomes registered client 46. Registered client 46 can then access non-secure web pages 34, as shown in step 150, at which point web server 12 verifies session cookie 40 of registered client 46 in step 152. If session cookie 40 is not valid, control passes to step 154 where web server 12 denies the request of registered client 46 for access to non-secure web page 34 and sends an error web page to the web browser of registered client 46. Alternatively, if session cookie 40 is valid then registered client 46 can access non-secure web page 34 in step 156. Registered client 46 may then go on to access other non-secure web pages 34 in which verification of session cookie 40 occurs with each access request. In step 160, registered client 46 requests access to secure web page 32 after which, in step 162, web server 12 determines if registered client 46 is using HTTPS. If HTTPS is not being used then web server 12 informs the web browser of registered client 46 to switch to HTTPS in step 164. The use of HTTPS is then checked in step 166. If registered client 46 is not using HTTPS, then the process flows to step 168 where web server 12 denies the request of registered client 46 to access secure web page 32 and sends an error web page to the web browser of registered client 46. Alternatively, if HTTPS is being used, then control passes to step 170 where web server 12 verifies authcode cookie 42. If authcode cookie 42 is not valid then the process flows to step 172 where web server 12 denies the request of registered client 46 for access to secure web page 32 and sends an error web page to the web browser of registered client 46. Alternatively, if authcode cookie 42 is valid, then registered client 46 can access secure web page 32 in step 174. Registered client 46 may then go on to access a number of secure web pages 32 in which verification of authcode cookie 42 occurs with each access request. Registered client 46 can also shop as seen in step 178. If registered client 46 makes purchases then in step 180, registered client 46 pays for the purchases and web server 12 stores data about the purchases made in database 24. Next, in step 182, registered client 46 either logs out of web site 20, accesses another web site or simply quits their web browser application. Regardless of the choice made by registered client 46, once registered client 46 quits their web browser application, session cookie 40 and authcode cookie 42 are destroyed because they are preferably defined as temporary cookies.

Figure 6A:
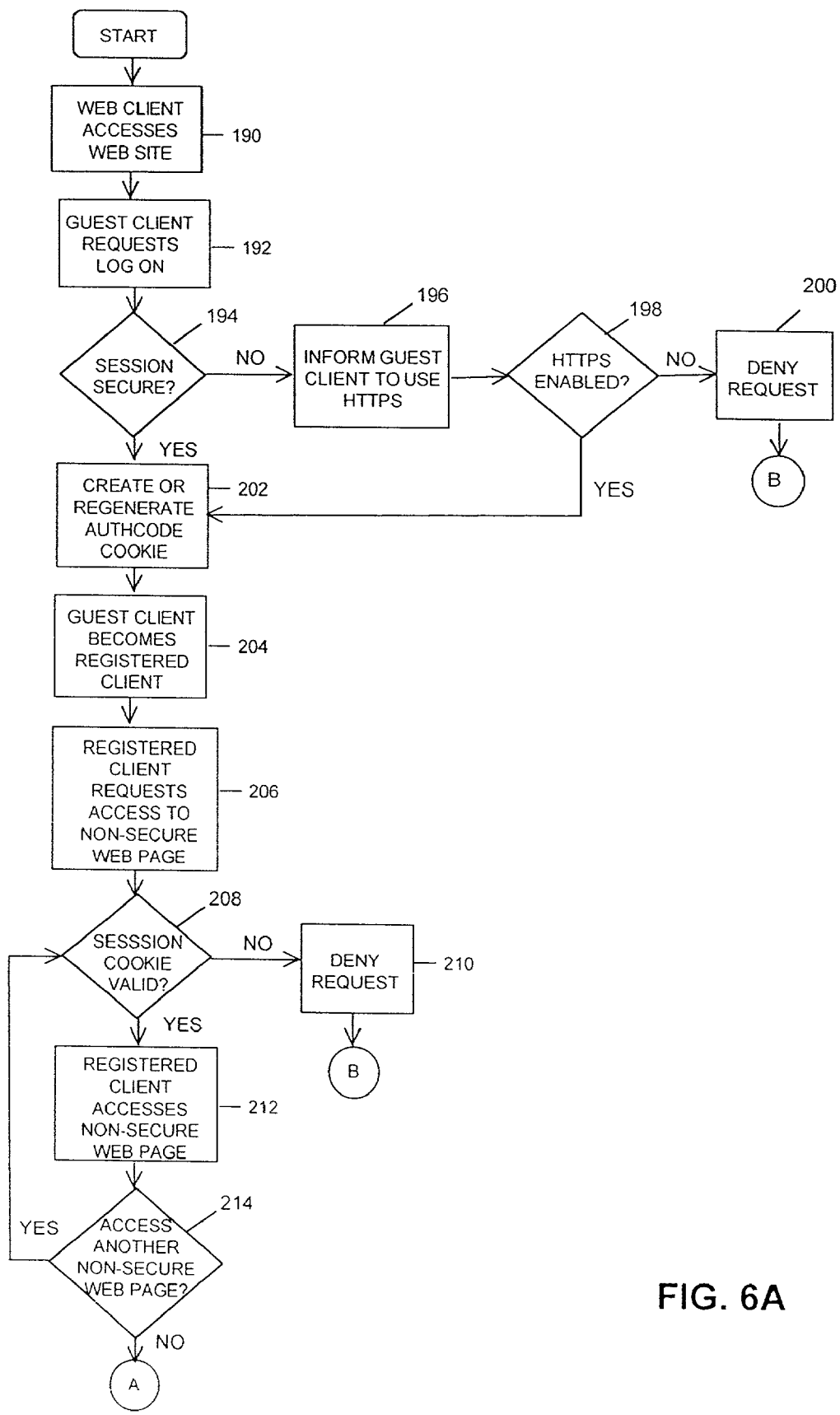
FIG. 6a and FIG. 6b together comprise a flowchart of a third usage scenario of the present invention.
Figure 6B:
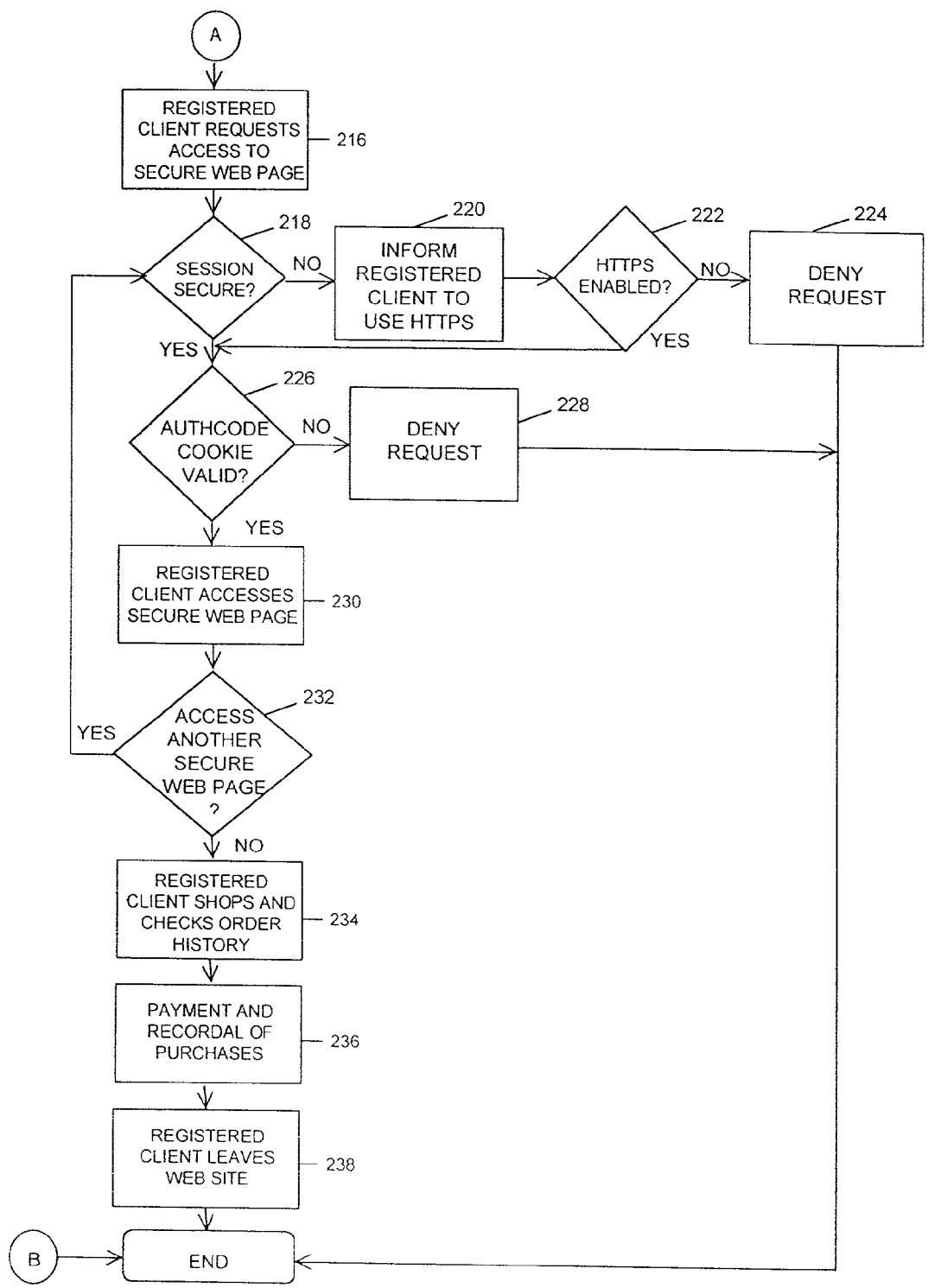

Referring now to FIGS. 6a and 6b, the scenario begins at step 190 where web client 16, who has already registered with web site 20, accesses web site 20. Web client 16 is defined as guest client 44 by default. A guest client account is then created in USER_SESSION table 36 and session cookie 40 is created and sent to guest client 44. Guest client 44 then decides to log on in step 192 at which point web server 12 must determine if guest client 44 is using HTTPS in step 194. If not, then web server 12 informs the web browser of guest client 44 to use HTTPS in step 196. The use of HTTPS is checked in step 198. If HTTPS is not being used, then the process flows to step 200 where web server 12 denies the request of guest client 44 to log on and sends an error web page to the web browser of guest client 44. Alternatively, if guest client 44 is using HTTPS, then the process flows to step 202 where authcode cookie 42 is created or updated and sent to the web browser of guest client 44. Next, in step 204, guest client 44 logs on and becomes registered client 46. Registered client 46 can then access non-secure web page 34 on web site 20 in step 206 at which point web server 12 verifies session cookie 40 in step 208. If verification fails, the process flows to step 210 where web server 12 denies the request of registered client 46 to access non-secure web page 34 and sends an error web page to the web browser of registered client 46. Alternatively, if session cookie 40 is valid then the process flows to step 212 where registered client 46 accesses non-secure web page 34. Registered client 46 can then go on to access a number of non-secure web pages 34 in which verification of session cookie 40 occurs with each access request. Next, in step 216, registered client 46 requests access to secure web page 32. Web server 12 then checks to see if HTTPS is being used by registered client 46 in step 218. If HTTPS is not being used, then web server 12 informs the web browser of registered client 46 to use HTTPS in step 220. The usage of HTTPS is checked in step 222. If HTTPS is not being used, then the process flows to step 224 where web server 12 denies the request of registered client 46 to access secure web page 32 and sends an error web page to the web browser of registered client 46. Alternatively, if registered client 46 is using HTTPS, then the process flows to step 226 where authcode cookie 42 is verified. If verification fails, the process flows to step 228 where web server 12 denies the request of registered client 46 to access secure web page 32 and sends an error web page to the web browser of registered client 46. Alternatively, if verification is successful, then registered client 46 can access secure web page 32 in step 230. Registered client 46 can also shop and/or check their order history as shown in step 234. If any purchases are made, then registered client 46 pays for these purchases and web server 12 stores data about these purchases in database 24 in step 236. Registered client 46 can then leave web site 20 in step 238 by logging out, accessing a different web site or simply quitting their web browser application. Regardless of the choice made by registered client 46, once registered client 46 quits their web browser application, session cookie 40 and authcode cookie 42 are destroyed because they are preferably defined as temporary cookies.

The system and method implemented in the present invention is designed to prevent access by unauthorized users to sensitive information about web site 20 or web client 16. For instance, if web client 16 is a guest client 44 without authcode cookie 42, i.e. guest client 44 has not accessed any secure web pages 32, then there is no secure information associated with guest client 44. The unauthorized user can not do anything harmful in this case. Another situation would be if web client 16 is a guest client 44 with authcode cookie 42 (i.e. web client 16 has already accessed a secure web page 32). In this case, an unauthorized user's attempt will fail since the unauthorized user can only use session cookie 40, does not have authcode cookie 42 and web server 12 already knows that guest client 44 has authcode cookie 42 (by checking AUTHCODE 56 in USER_SESSION table 36). Another alternative situation would be if web client 16 is a registered client 46 and an unauthorized user tries to use session cookie 40 to browse secure web pages 32. Since the unauthorized user does not have authcode cookie 42, web server 12 will redirect the unauthorized user to the login web page at which point the unauthorized user won't be able to log on since they do not have the login ID or password of registered client 46.

To recapitulate, the present invention allows for either a non-secure (HTTP) or secure (HTTPS) communication protocol to be used when a web client accesses a non-secure web page or a secure web page, respectively, at a web site. This provides for a secure and efficient session between the web client and the web site. Further, two distinct cookies are used, a session cookie (for session management) and an authcode cookie (for authentication). The session cookie is also designed such that it does not contain sensitive information about the web client. Finally, the web site allows for either guest client or registered client access which increases the flexibility and user appeal of the web site.

It should be mentioned that although the present invention has been described in the context of an e-commerce web site, it is not the intent of the inventor to restrict the use of the present invention to the use of e-commerce alone. For instance, the present invention may be used to secure the exchange of data for non e-commerce functions such as online voting, issuing credit card numbers, online stock trading and the like.

The present invention may also be readily adapted to utilize name-value pairs for authentication and session management between the web site and the web client by directing web server 12 to generate a session name-value pair and passing this session name-value pair to every web page 22 on web site 20. Web server 12 also generates an authcode name-value pair and passes it to every secure web page 32 on web site 20.

It is to be understood that what has been described are preferred embodiments to the invention. The invention nonetheless is susceptible to certain changes and alternative embodiments fully comprehended by the spirit of the invention as described above, and the scope of the claims set out below.

What is claimed is:

1. A method of secure session management and authentication between a web site and a web client, said web site having secure and non-secure web pages, said method comprising the steps of:

a) utilizing a non-secure communication protocol and a session cookie when said web client requests access to said non-secure web pages;

b) utilizing a secure communication protocol and creating an authcode cookie when said web client requests access to said secure web pages, so that utilizations of said authcode cookie are interspersed between utilizations of said session cookie, and at least some utilizations of said session cookie take place after utilizations of said authcode cookie;

c) requesting said session cookie from said web client whenever said web client requests access to said non-secure web pages and verifying said requested session cookie;

d) requesting said authcode cookie from said web client whenever said web client requests access to said secure web pages and verifying said requested authcode cookie; and wherein said method also comprises alternating between said secure communication protocol and said non-secure communication protocol when said web client alternates requests for access to said secure web pages and said non-secure web pages, respectively, and also repeatedly alternating between said utilizations of said authcode and said utilizations of said session code.

2. The method of claim 1, wherein said alternating between said secure communication protocol and said non-secure communication protocol is facilitated by a table which keeps track of said non-secure web pages and said secure web pages.

3. The method of claim 2, wherein said web site uses said table to direct said web client to use said secure communication protocol or said non-secure communication protocol depending on whether said web client requests access to said non-secure web pages or said secure web pages.

4. The method of claim 3, wherein said method also comprises allowing said web client to be a guest client or a registered client.

5. The method of claim 4, wherein said method also comprises creating stored information including data contained in said session cookie, data contained in said authcode cookie and data about said web client.

6. The method of claim 5, wherein said session cookie includes a pointer and an encrypted portion, said pointer pointing to said stored information, said encrypted portion having a random portion and a date portion.

7. The method of claim 5, wherein said authcode cookie includes an encrypted portion, said encrypted portion having a random portion and a date portion.

8. The method of claim 6, wherein verifying said requested session cookie from said web client includes using said stored information to generate a second session cookie and comparing said second session cookie to said session cookie requested from said web client.

9. The method of claim 7, wherein verifying said requested authcode cookie from said web client includes using said stored information to generate a second authcode cookie and comparing said second authcode cookie to said authcode cookie requested from said web client.

10. A system, for secure session management and authentication between a web site and a web client, said system comprising a web server, a web client and a communication channel, said web server coupled to said web client via said communication channel, said web server having a web site, said web site including:

a) secure and non-secure web pages;

b) a non-secure communication protocol and a session cookie that is used for allowing said web client access to each one of said non-secure web pages;

c) a secure communication protocol and an authcode cookie that is used for allowing said web client access only to said secure web pages;

d) verification means for verifying said session cookie when said session cookie is requested from said web client; and e) verification means for verifying said authcode cookie when said authcode cookie is requested from said web client;

wherein said web server further comprises:

a security alternating means for alternating between said secure communication protocol and said non-secure communication protocol.

11. The system of claim 10, wherein said web server further comprises a table to keep track of said non-secure web pages and said secure web pages.

12. The system of claim 10, wherein said web site includes access means to allow said web client to access said web site as a guest client or a registered client.

13. The system of claim 12, wherein said web system has storage means for containing stored information about said web client, data contained in said session cookie and data contained in said authcode cookie.

14. The system of claim 13, wherein said session cookie includes a pointer and an encrypted portion, said pointer pointing to said stored information, said encrypted portion having a random portion and a date portion.

15. The system of claim 13, wherein said authcode cookie includes an encrypted portion, said encrypted portion having a random portion and a date portion.

16. A computer program embodied on a computer readable medium, said computer program providing for secure session management and authentication between a web site and a web client, said web site having secure and non-secure web pages, said computer program adapted to:

a) use a non-secure communication protocol and a session cookie when said web client requests access to said non-secure web pages;

b) use a secure communication protocol and an authcode cookie when said web client requests access to said secure web pages;

c) request said session cookie from said web client when said web client requests access to said non-secure web pages and to verify said requested session cookie; and d) request said authcode cookie from said web client when said web client requests access to said secure web pages and to verify said requested authcode cookie;

wherein said computer program is further adapted to alternate between said secure communication protocol and said non-secure communication protocol when said web client alternates requests for access to said secure web pages and said non-secure web pages.

17. The computer program of claim 16, wherein said alternating between said secure communication protocol and said non-secure communication protocol is facilitated by a table which keeps track of said non-secure web pages and said secure web pages.

18. The computer program of claim 17, wherein said computer program uses said table to direct said web client to use said secure communication protocol or said non-secure communication protocol depending on whether said web client requests access to said non-secure web pages or said secure web pages.

19. The computer program of claim 16, wherein said computer program is adapted to allow said web client to be a guest client or a registered client.

20. The computer program of claim 19, wherein said computer program is adapted to create stored information including data contained in said session cookie, data contained in said authcode cookie and data about said web client.

21. The computer program of claim 20, wherein said session cookie includes a pointer and an encrypted portion, said pointer pointing to said stored information, said encrypted portion having a random portion and a date portion.

22. The computer program of claim 20, wherein said authcode cookie includes an encrypted portion, said encrypted portion having a random portion and a date portion.

23. The computer program of claim 21, wherein verifying said requested session cookie from said web client includes using said stored information to generate a second session cookie and comparing said second session cookie to said session cookie requested from said web client.

24. The computer program of claim 23, wherein verifying said requested authcode cookie from said web client includes using said stored information to generate a second authcode cookie and comparing said second authcode cookie to said authcode cookie requested from said web client.

25. The computer program of claim 16, wherein said computer program is adapted to create a NAME attribute in a session cookie:
   a) generating a user_id
   b) generating a session_string;
   c) generating a session_timestamp;
   d) appending said session_timestamp to said session_string to create an intermediate value;
   e) applying a one way hash function to said intermediate value to create a final value; and
   f) storing said final value in said NAME attribute.

26. The computer program of claim 16, wherein said computer program is adapted to create a NAME attribute in an authcode cookie by:
   a) generating an authcode;
   b) generating an authcode_timestamp;
   c) appending said authcode_timestamp to said authcode to create an intermediate value;
   d) applying a one way hash function to said intermediate value to create a final value; and
   e) storing said final value in said NAME attribute.

* * * * *